March 12, 1940. F. J. CULLOMER ET AL 2,193,582
TOASTER
Filed May 15, 1939
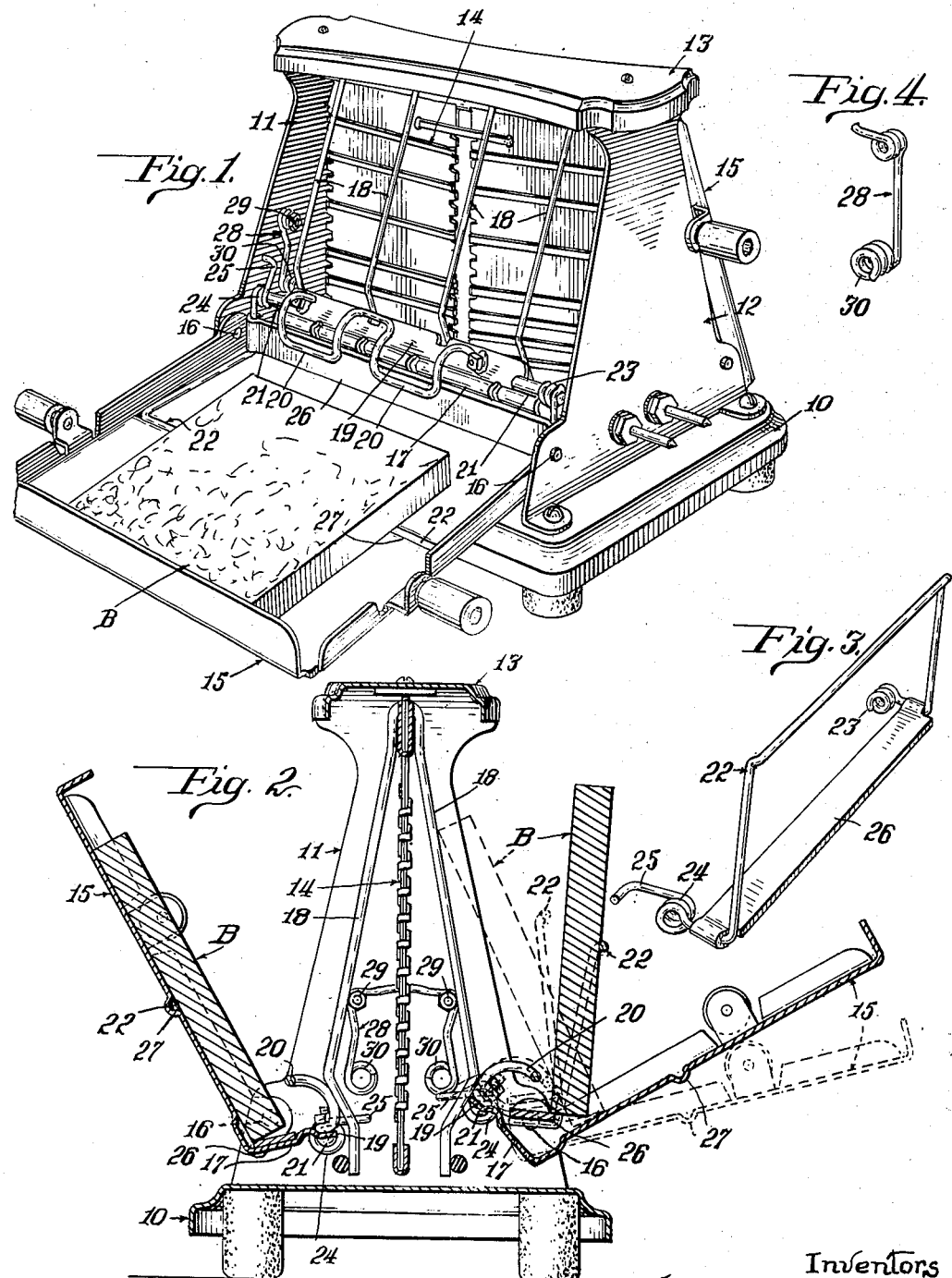
Inventors
Frank J. Cullomer
Victor Emanuel
By George Heideman
Attorney Patented Mar. 12, 1940

2,193,582

UNITED STATES PATENT OFFICE 2,193,582

TOASTER

Frank J. Cullomer and Victor Emanuel, Chicago, Ill.

Application May 15, 1939, Serial No. 273,626

11 Claims. (Cl. 53—5)

Our invention relates to bread toasters, whether of a single or double type, wherein the heating element is vertically arranged intermediate of the opposite sides or doors and the bread held in spaced relation with the heating element by a suitable grille.

Our invention pertains to a toaster wherein the slice of bread, during a partial opening of the doors, will be held in a sufficiently tilted position to permit proper inspection of the toasting side and involves means, automatically controlled by movement of the door or doors, which causes the bread-slice to be automatically turned over or reversed during such movement in order to present the other or untoasted side to the heating element; a portion of said means, during further movement of the door and before the door reaches and passes a horizontal position, automatically moves from its bread shifting and tilting position to a position out of the path of the bread-slice to permit the lower end of the bread-slice to slide outwardly on the fully opened door with the toasted side of the bread-slice in contact with the door and hence into position where the toasted side will be facing away from the heating element when the door is swung upwardly into closed position; it being understood that the doors of the toaster are hingedly secured at their lower ends; our improved means being also adapted to prevent the bread being subjected to improper pressures during the door operation.

The objects and advantages of our invention will be readily comprehended from the detailed description of the accompanying drawing wherein:

Figure 1 is a perspective view of our improved toaster with one side door in lowered and complete open position and the bread-slice holding portion of our improved means in its retracted position.

Figure 2 is a vertical sectional view with one side door partly open and the bread-slice in inspection position; while the other side door has been moved beyond inspection position and our improved bread-slice controlling means approaching the bread-slice tilting and releasing position; the latter position being indicated in dotted lines.

Figure 3 is a detail perspective view of our improved bread-slice controlling means.

Figure 4 is a detail perspective view of the controlling means releasing element.

Our invention relates to the turn-over type of toaster and involves means whereby proper inspection of the toasting side of the bread is permitted during a partial opening of the doors and whereby the slice of bread is shifted into an unbalanced position during further opening movement of the door, said means ensuring a positive turning over of the slice of bread when the door is completely opened and thus enabling the opposite side of the bread to be presented toward the heating element.

For purposes of exemplification, we have illustrated our invention with a toaster having sloping sides but it will be understood that the invention is also adapted for use in connection with what is known as the vertical or straight sided type wherein inspection and a positive turning over of the slice of bread cannot be accomplished.

The toaster shown in the drawing comprises the usual base 10 provided with two end walls 11 and 12, the connecting top 13 and suitable heating elements indicated at 14, extending vertically from top to bottom at a point substantially midway between the two sides which latter constitute the doors 15, 15. The doors are pivotally connected at their lower ends at 16 to permit the upper free ends of the doors to swing downwardly into a plane beneath the pivotal points when the doors are in complete open position, in which position the lower end of the slice of bread indicated at B will slide downwardly along the fully opened door with its toasted side downward.

The lower pivoted ends of the doors are each provided with a flange 17 disposed inwardly beyond the pivotal point of the door to provide a support for the lower edge of the bread-slice while in toasting position against the grille 18 which prevents the bread coming into contact with the heating element. The flange 17, intermediate of its ends, is extended as shown at 19 and the extension provided with an outwardly extending and downwardly curved bread contacting element or guard 20 which engages the lower end of the bread-slice and prevents its movement inwardly during opening movement of the door and assists in forcing the lower edge of the bread outwardly along the inner face of the lowered door; the guard 20 being formed to present curved surfaces to the bread so as not to cut into the bread and also provide sliding contact. The guard 20, for purposes of exemplification, is in the nature of a wire bent into multiple loops with the ends secured to the flange extension 19, although it may consist of an integral part of the extension. The ends of the flange extension 19 are formed to provide the trunnion portions 21, 21 for pivotally holding a loop element 22 of rectangular form approximating the width of the door, as shown in Figures 1 and 3. The ends of the loop 22 are formed into small loops or eyelets 23, 24 to loosely receive the trunnions 21. The eyelet 24 is provided with an angular finger 25; and the angularly disposed ends of the loop in advance of the eyelets 23, 24 are connected by a flat metal strip 26 which moves with the loop element 22; the strip 26 being intended to support the lower edge of the bread when the latter is in toasting position.

The doors 15, at predetermined points removed from their pivotal ends and the pivoted ends of the bread holding loop 22, are provided with a transversely disposed groove indicated at 27, intended to receive the outer transverse portion of the loop 22 when the latter moves into retracted position after being released from bread tilting position shown in dotted lines at the right in Figure 2; the release of the loop being automatically accomplished by movement of the door beyond bread inspection position shown in full lines at the left in Figure 2; namely after the loop 22 has been released from the bread tilting position indicated in dotted lines at the right in Figure 2. The grooves 27 in the doors 15 are of a depth sufficient to completely receive the loop 22 in order to provide a smooth sliding surface on the door for the lower edge of the bread during its reversing movement.

The end wall 11 of the toaster is provided with the trigger mechanism 28 shown in Figure 4. This trigger mechanism is shown in the nature of a spring wire extending transversely of the end wall 11 to function on both sides of the toaster; the wire being secured to the end wall at 29, 29 and the ends disposed downwardly and terminating in the coiled ends 30; it being understood that the coiled ends 30 are free to flex in a direction transversely of the toaster end wall. The coiled ends 30 are disposed in the arcuate paths of the bent ends of the fingers 25 of the bread tilting loops 22 when the latter are in normal upright position, as shown at the right in Figure 2. The trigger 28, although resilient, is also of sufficient stiffness to operate the bread tilting means 22—26; the coils 30 of the mechanism 28 affording sufficient engaging and rounded surfaces for the finger 25, which permit the latter to slide about the coils when the doors are opened sufficiently to tilt plate 26 which in turn applies outward pressure on the loop 22 and causes the fingers 25 to flex the coiled ends 30 laterally sufficiently to allow the fingers to slide over the coils 30, thereby releasing the bread tilting loops 22, permitting them to drop outwardly into the grooves 27 of the doors below the paths of the lower edges of the bread-slices so the toasted sides of the bread-slices may fall toasted side downward.

As is apparent from Figure 2, the loop 22 remains in the groove 27 of the door when the door is opened partly for inspection as shown at the left, at which time the finger 25 is in engagement with the lower side of the coil 30 of the trigger mechanism and further outward swinging movement of the loop 22 will be prevented. If the side of the bread-slice has been sufficiently toasted and the door is tilted farther outwardly, the loop 22 remains in contact with the outer or untoasted side of the bread-slice B as shown in full lines at the right in Figure 2 and holds the bread in upright position until the door is dropped further downward, thereby causing the door-flange 17 to slightly lift plate 26 which induces the loop 22, swiveled on the trunnions 21, 21, to swing inwardly at top toward the toaster, because of the engagement of finger 25 with the coiled end 30 of the trigger mechanism 28. The inward movement of the top of loop 22 is indicated in dotted lines at the right in Figure 2; this inward movement forcing the bread-slice into the unbalanced position shown in dotted lines, namely with the upper end of the bread-slice thrown against the grille 18 while the lower end of the bread-slice is forced outwardly by the guard element 20, causing the lower end of the bread-slice to slide off lifting plate 26. The increasing pressure on the plate 26 and hence on finger 25, resulting during the continued outward movement of the door, causes the resilient trigger mechanism 28 to flex laterally and permit the finger 25 to slide from beneath the coil 30 and to automatically fall into the door-groove 27 before the lower end of the bread-slice B begins to slide; the retracted position of the loop allowing the lower end of the bread-slice B to slide along the lowered door with its toasted side downward. The loop with its finger moves into engagement with the trigger mechanism when the door is swung upwardly into closed position.

The exemplification shown and described is believed to be the simplest embodiment of the invention, but certain modifications are possible without departing from the spirit of the invention.

What we claim is:

1. In a toaster of the character described provided with a downwardly swinging door having an inwardly disposed flange at the lower pivoted end; a guard element secured to said flange adapted to move the lower end of the bread-slice outwardly a predetermined degree when the door is opened; a loop element pivotally secured at one end to the door-flange so as to swing outwardly with the door, said loop being adapted to extend substantially parallel with the door when the latter is in closed position and in complete open position; trigger mechanism secured to an end wall of the toaster adapted to effect holding engagement with the loop element during the initial opening movement of the door; and a bread-slice supporting element, associated with the pivoted end of the loop, adapted to be engaged by the door-flange when the door is opened and to force said loop out of holding engagement with said latch mechanism.

2. In a toaster of the character described provided with a downwardly swinging door having an inwardly disposed flange at the lower pivoted end; means associated with the flange adapted to move the lower end of the bread-slice outwardly; bread-slice controlling means pivotally secured to the door-flange and involving a bread-slice supporting element and a bread-slice tilting element, said means being adapted to tilt outwardly with the door; and trigger mechanism secured to the toaster wall adapted to effect a yielding holding relation with said controlling means during the initial outward tilting movement and to reverse said tilting movement at a predetermined moment in the opening movement of the door.

3. In a toaster of the character described having a downwardly swinging door provided with an inwardly disposed flange at its lower pivoted end, the flange at opposite ends having trunnion providing portions; bread-slice controlling means mounted on said trunnion portions so as to swing outwardly when the door is opened, said means involving a bread-slice supporting portion and a bread-slice tilting portion; and spring trigger mechanism secured to the toaster wall adapted to yieldingly hold and to momentarily reverse the outward tilting movement of said controlling means at a predetermined moment in the opening movement of the door.

4. In a toaster of the character described provided with a downwardly swinging door; bread-slice controlling means involving a bread-slice supporting plate and bread-slice tilting elements; and trigger mechanism adapted to effect yielding operative engagement with one of said tilting elements during the initial opening movement of the door whereby said supporting plate is tilted and said last mentioned tilting element is moved into bread-slice tilting position and then permitted to swing outwardly into parallel relation with the door.

5. In a toaster of the character described provided with a downwardly swinging door; bread-slice controlling means, mounted adjacent the lower pivoted end of the door, involving a supporting and lifting portion and a bread-slice tilting portion; and trigger mechanism secured to a wall of the toaster adapted to actuate said controlling means during the opening movement of the door.

6. In a toaster of the character described provided with a downwardly swinging door; bread-slice controlling means mounted adjacent the lower pivoted end of the door, involving a bread-slice supporting and lifting portion, a second portion adapted to move the lower end of the bread-slice outwardly, and a third portion adapted to move the upper end of the bread-slice inwardly; and trigger mechanism secured to the toaster wall adapted to actuate said controlling means during the opening movement of the door.

7. In a toaster of the character described provided with a downwardly swinging door pivoted at its lower end; means mounted on the lower end of the door adapted to force the lower end of the bread-slice outwardly during the initial opening movement of the door; means pivotally secured to the lower end of the door adapted to force the upper end of the bread-slice inwardly and to swing outwardly substantially parallel with the door; and trigger mechanism secured to the toaster wall whereby said last mentioned means is actuated at a predetermined moment in opening movement of the door.

8. In a toaster of the character described provided with a downwardly swinging door pivoted at its lower end, the door at a predetermined point being provided with a transversely disposed groove on its inner face; means mounted on the lower end of the door adapted to force the lower end of the bread-slice outwardly; a bread-slice holding and controlling loop disposed transversely of the inner face of the door and adapted to normally lie in said groove, the ends of the loop being fulcrumed at the inner end of the door rearward of the pivotal point of the door; and trigger mechanism secured to a toaster wall adapted to effect operative engagement with the pivoted end of said loop whereby the latter is tilted inwardly at a prearranged moment during the opening of the door and the bread-slice thrown into unbalanced position.

9. In a toaster of the character described provided with a downwardly swinging door pivoted at its lower end, the door at a predetermined point being provided with a transversely disposed groove on its inner face; means mounted on the lower end of the door adapted to force the lower end of the bread-slice outwardly; a bread-slice holding and controlling loop disposed transversely of the inner face of the door and adapted to normally lie in said groove, the end of the loop being fulcrumed at the inner end of the door rearward of the pivotal point of the door and provided with a laterally disposed finger; and trigger mechanism secured to a toaster wall adapted to effect operative engagement with said finger whereby the loop is tilted inwardly at a prearranged moment during the opening of the door and the bread-slice thrown into unbalanced position.

10. In a toaster of the character described provided with a downwardly swinging door with the lower pivoted end provided with a bread-slice supporting portion; means associated with the lower end of the door for forcing the lower end of the bread-slice outwardly; a loop fulcrumed at the lower end of the door for holding the bread-slice and for tilting the upper end of the bread-slice inwardly at a predetermined moment during the opening of the door; and spring trigger means secured to the toaster wall adapted to effect yielding operative relation with said loop and to cause the latter to move the upper end of the bread-slice in unbalanced position.

11. In a toaster of the character described provided with a downwardly swinging door; means associated with the lower end of the door whereby the lower end of the bread-slice is forced outwardly; pivoted means for holding the upper end of the bread-slice and for forcing said end inwardly during predetermined moments in the door opening; and trigger mechanism secured to a toaster wall whereby said last mentioned means is moved into bread-tilting position.

FRANK J. CULLOMER.
VICTOR EMANUEL.